(12) United States Patent
Hernandez et al.

(10) Patent No.: US 9,151,252 B2
(45) Date of Patent: Oct. 6, 2015

(54) SYSTEMS AND METHODS FOR IMPROVED COMBUSTION

(71) Applicant: General Electric Company, Schenectady, NY (US)

(72) Inventors: Yaru Najem Mendez Hernandez, Munich (DE); Jorge Carretero Benignos, Munich (DE); Joerg Hermann Stromberger, Hallbergmoos (DE); Sean Craig Jenkins, Haimhausen (DE)

(73) Assignee: General Electric Company, Niskayuna, NY (US)

( * ) Notice: Subject to any disclaimer, the term of this patent is extended or adjusted under 35 U.S.C. 154(b) by 480 days.

(21) Appl. No.: 13/629,638

(22) Filed: Sep. 28, 2012

(65) Prior Publication Data

US 2014/0090621 A1    Apr. 3, 2014

(51) Int. Cl.
| | |
|---|---|
| *F02M 39/00* | (2006.01) |
| *F02M 57/06* | (2006.01) |
| *F02M 27/04* | (2006.01) |
| *F23D 11/24* | (2006.01) |
| *F02B 23/10* | (2006.01) |
| *F23N 1/00* | (2006.01) |
| *F23C 99/00* | (2006.01) |

(Continued)

(52) U.S. Cl.
CPC .............. *F02M 27/04* (2013.01); *F02B 23/101* (2013.01); *F02M 39/00* (2013.01); *F02M 57/06* (2013.01); *F23C 99/001* (2013.01); *F23D 11/24* (2013.01); *F23D 11/32* (2013.01); *F23N 1/00* (2013.01); *F23R 3/00* (2013.01); *Y02T 10/125* (2013.01)

(58) Field of Classification Search
CPC ....... F02M 27/04; F02M 57/06; F02M 39/00; F23D 11/24; F23D 11/32; F23R 3/00; F02B 23/101; Y02T 10/125
USPC .......................................... 123/294, 305, 297
See application file for complete search history.

(56) References Cited

U.S. PATENT DOCUMENTS

| | | | |
|---|---|---|---|
| 3,749,545 | A | 7/1973 | Velkoff |
| 4,091,779 | A | 5/1978 | Saufferer et al. |

(Continued)

FOREIGN PATENT DOCUMENTS

EP           856659 A2      8/1998

OTHER PUBLICATIONS

Nabity et al., A MEMS Fuel Atomizer for Advanced Engines; Conference on Micro-Nano-Technologies—CANEUS, Nov. 1-5, 2004; 9 pages; California.

(Continued)

*Primary Examiner* — Hieu T Vo
(74) *Attorney, Agent, or Firm* — Ann M. Agosti

(57) ABSTRACT

A combustion system is presented. The combustion system includes a hollow combustion chamber having a chamber head, chamber sidewalls, and a chamber bottom. Further, the combustion system includes a fuel injector coupled to the combustion chamber and configured to introduce a plurality of fuel droplets in the combustion chamber. Moreover, the combustion system includes a first electrode and a second electrode disposed on or about the combustion chamber such that an electromagnetic field is generated between the first electrode and the second electrode in response to an applied electric signal, and where the electromagnetic field is configured to control a trajectory of the plurality of fuel droplets within the combustion chamber.

20 Claims, 5 Drawing Sheets

(51) Int. Cl.
*F23D 11/32* (2006.01)
*F23R 3/00* (2006.01)

(56) References Cited

U.S. PATENT DOCUMENTS

| | | | |
|---|---|---|---|
| 4,150,647 A | 4/1979 | Suzuki et al. | |
| 4,439,980 A | 4/1984 | Biblarz et al. | |
| 5,234,170 A | 8/1993 | Schirmer et al. | |
| 6,470,684 B2 | 10/2002 | Wilbraham | |
| 6,755,175 B1 * | 6/2004 | McKay et al. | 123/297 |
| 2008/0191068 A1 | 8/2008 | Allen et al. | |
| 2010/0024783 A1 | 2/2010 | Tao et al. | |
| 2011/0198408 A1 | 8/2011 | Zakharov | |

OTHER PUBLICATIONS

Tao; Electric-Field Assisted Fuel Atomization; Department of Physics, Temple University; 5 pages; Download from the internet:<http://www.rexresearch.com/tao/espray.pdf>; Philadelphia, USA., Sep. 27, 2012.

* cited by examiner

SYSTEMS AND METHODS FOR IMPROVED COMBUSTION

BACKGROUND

Embodiments of the present disclosure are related to combustion engines, and more particularly to systems and methods for improving the efficiency of combustion engines.

In most vehicles or power generation systems, a combustible fuel is burned in an engine to generate thermal energy. The thermal energy may be converted into mechanical energy or electrical energy. Alternatively, the thermal energy may be utilized to provide a thrust to move the vehicle. For burning the fuel, the engine may include a combustion chamber or combustor into which compressed (i.e., high temperature and pressure) air is introduced. Further, a fuel injector may be employed to spray a fuel such as pulverized coal, natural gas, liquefied propane gas, diesel, kerosene, or petrol into the combustion chamber for ignition. In some systems, because of the high temperature and pressure of the compressed air within the combustion chamber, the fuel may self-combust. Alternatively, the combustion chamber may include an igniter such as a spark plug to ignite the fuel. Combustion of the fuel may expand the gases within the combustion chamber, thereby increasing the pressure of the gases and causing the gases to escape from an outlet of the combustion chamber with force. This force may be utilized to move various parts of the engine, provide the thrust required to push the vehicle forward, or generate electric power.

Engineers have attempted to optimize fuel spray characteristics such as spray trajectory, spray diameter, and spray velocity and/or the interaction of the fuel spray with the chamber sidewalls to improve the efficiency of the engine and reduce toxic emissions. If the fuel is sprayed such that the fuel clings onto the sidewalls of the combustion chamber, the ignition of the fuel or the expansion of the gases within the combustion chamber may not be optimal. Further, a relatively small diameter of the fuel spray may result in the fuel droplets clinging to one another and forming larger droplets, which may in turn cause the fuel droplets to ignite at different times instead of igniting simultaneously. The spray diameter is generally representative of the distance between the furthest fuel droplets along the furthest plane from the fuel injector. Presently available fuel injectors rely on the diameter of the nozzles in the fuel injector, the spacing and placement of the nozzles, or the placement of the injector to optimize spray characteristics.

BRIEF DESCRIPTION

According to one aspect of the present disclosure, a combustion system is presented. The combustion system includes a hollow combustion chamber having a chamber head, chamber sidewalls, and a chamber bottom. Further, the combustion system includes a fuel injector coupled to the combustion chamber and configured to introduce a plurality of fuel droplets in the combustion chamber. Moreover, the combustion system includes a first electrode and a second electrode disposed on or about the combustion chamber such that an electromagnetic field is generated between the first electrode and the second electrode in response to an applied electric signal, and where the electromagnetic field is configured to control a trajectory or a spray diameter of the plurality of fuel droplets within the combustion chamber.

According to another aspect of the present disclosure, a combustion system is presented. The combustion system includes a combustion chamber having a chamber head, chamber sidewalls, and a chamber bottom. Also, the combustion system includes a fuel injector coupled to the combustion chamber and configured to channelize a fuel into the combustion chamber, where the fuel injector is operatively coupled to a voltage source and configured as a first electrode of the combustion system, where the combustion chamber is configured as a second electrode of the combustion system, and where the combustion system is configured to generate an electromagnetic field between the first electrode and the second electrode in response to an applied electric signal.

According to yet another aspect of the present disclosure, a method for controlling the trajectory of a plurality of fuel droplets within a combustion chamber is presented. The method includes generating an electromagnetic field between a first electrode and a second electrode disposed about the combustion chamber. Moreover, the method includes introducing the plurality of fuel droplets into the combustion chamber. Furthermore, the method includes controlling the trajectory of the plurality of fuel droplets within the combustion chamber based on a direction and magnitude of the electromagnetic field.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure are related to electromagnetic field controlled combustion systems. In the electromagnetic field controlled combustion systems of the present disclosure, the electromagnetic field governs the characteristics of the fuel spray, such as its trajectory, particle size, gas stream, spray diameter, and therefore the efficiency of the engine. Moreover, the electromagnetic field may affect chemical reactions within the combustion systems to improve the combustion process and produce exhaust gases with lower emission levels. Throughout this disclosure, the terms electric field and electromagnetic field may be interchangeably used. Also, the electric field or the electromagnetic field may include an electrostatic field without departing from the scope of the present disclosure.

Figure 1:
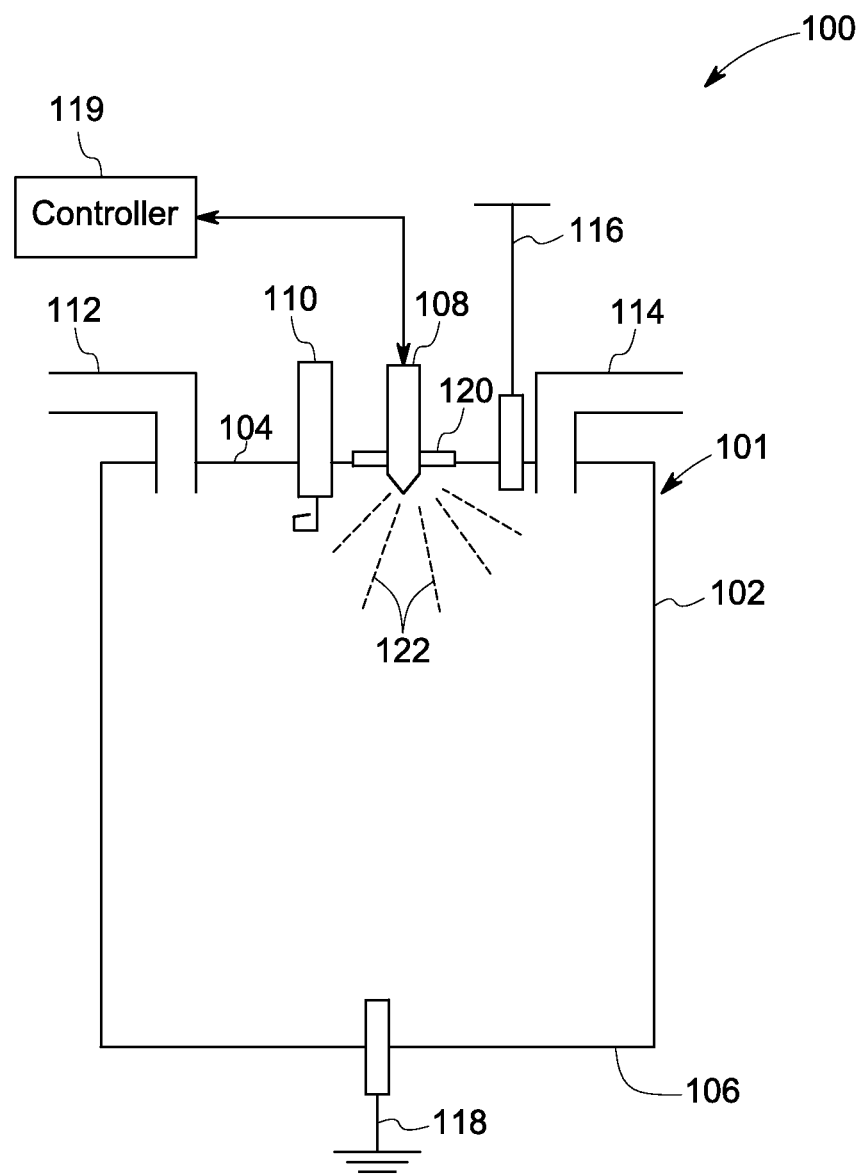
FIG. 1 is diagrammatical representation of an exemplary combustion system, according to aspects of the present disclosure.

FIG. 1 illustrates an exemplary combustion system 100. The combustion system 100 may be employed in an automobile engine, such as a diesel direct injection internal combustion engine. Alternatively, the combustion system 100 may be employed in jet engines, combined cycle gas and steam turbines, gas turbines, coal power generation plants, or any other such devices that entail combustion of fuel. For example, the combustion system 100 may be installed in a gas turbine, where hot gases expelled by the combustion system 100 aid in rotating blades of the gas turbine.

The combustion system 100 of FIG. 1 may include a combustion chamber 101. The combustion system 100 may also include one or more fuel injectors, such as fuel injector 108. In one embodiment, the fuel injector 108 may be operatively coupled to the combustion chamber 101. Moreover, the fuel injector 108 may be configured to spray fuel into the combustion chamber 101. Also, in some embodiments, the combustion system 100 may include an igniter 110, such as a spark plug that is coupled to the combustion chamber 101 and configured to ignite the fuel. To allow air into the combustion chamber 101, the combustion system 100 may include an inlet valve 112. Further, to expel exhaust gases from the combustion chamber 101, the combustion system 100 may also include an outlet valve 114. In addition, the combustion system 100 may include a first electrode 116 and a second electrode 118.

Furthermore, the combustion chamber 101 may include chamber sidewalls 102, a chamber head 104, and a chamber bottom 106. In one embodiment, the inlet valve 112 and the outlet valve 114 may be disposed on the chamber head 104. Alternatively, the inlet valve 112 may be disposed on the chamber head 104, while the outlet valve 114 may be disposed on the chamber bottom 106. Further, the chamber bottom 106 may be fixed to the chamber sidewalls 102. However, in certain other cases, the chamber bottom 106 may be translatable. For example, in case the combustion system 100 is part of a four-stroke internal combustion engine, the chamber bottom 106 may be a piston coupled to a crankshaft. In this embodiment, the piston may be translatable between a top position and a bottom position. The top position may be representative of a position of the piston where the piston is disposed closest to the chamber head 104, while the bottom position may be representative of a position of the piston where the piston is disposed furthest away from the chamber head 104.

Moreover, the combustion chamber 101 (interchangeably referred to as chamber 101) may be a substantially cylindrical, hollow vessel. In other embodiments, the shape of the chamber 101 may vary. For example, the chamber 101 may have a substantially cuboidal, rhomboidal, conical, or polyhedral shape. It will be understood that the chamber 101 may also have an irregular shape without departing from the scope of the present disclosure. Also, the chamber 101 may be configured to withstand high temperatures ranging from about 100° C. to about 1500° C. and high pressures ranging from about 0.01 MPa to about 150 MPa. Accordingly, the chamber 101 may be formed using heat and pressure resistant materials. For example, the chamber 101, including the chamber head 104, the chamber sidewalls 102, and the chamber bottom 106 may be formed of cast iron, steel, iron, glass, and the like.

As described previously, the combustion system 100 may include the fuel injector 108. The fuel injector 108 may include an electronic or mechanical valve that is configured to supply fuel droplets 122 in the form of a fine mist or spray to the combustion chamber 101. It will be appreciated that the fuel may be in the form of liquid particles, gaseous particles, or solid particles. As used herein, the term fuel droplets 122 is used to refer to fuels, such as, but not limited to, liquid, gaseous, and solid pulverized particles. To produce the mist, one end of the fuel injector 108 may include one or more nozzles through which pressurized fuel is released into the chamber 101. The other end of the fuel injector 108 may be coupled to a fuel reservoir or pump (not shown), which supplies the pressurized fuel to the fuel injector 108. During operation, it may be desirable for the fuel injector 108 to spray the fuel droplets 122 multiple times in a determined period of time.

According to certain aspects of the present disclosure, a controller 119 may be employed to control operation of the fuel injector 108. The controller 119 may be an electric controller, an electronic controller, a mechanical controller, an electro-mechanical controller, or combinations thereof. Moreover, the controller 119 may be operationally coupled to the fuel injector 108. To provide the right amount of fuel droplets 122, the controller 119 may receive inputs from multiple sensors (not shown). Some exemplary sensors include oxygen sensors to monitor the amount of oxygen in the exhaust, throttle position sensors to determine the quantity of air injected into the chamber 101, and coolant temperature sensors to determine when the engine has reached a desired operating temperature. Other sensors may include voltage or current sensors to monitor the system voltage or current in a vehicle, a motor, a jet engine, or the like and manifold pressure sensors to monitor the pressure of the air in an intake manifold. Depending on the received inputs, the controller 119 may be configured to determine the appropriate amount of fuel to be supplied, and/or the frequency of fuel supply. Additionally, the controller 119 may be configured to control operation of the fuel injector 108 based on the determined amount of fuel and/or the frequency of fuel supply.

Furthermore, in certain embodiments, the fuel injector 108 may be coupled to the chamber head 104. Alternatively, the fuel injector 108 may be coupled to the chamber sidewalls 102. For instance, in case the combustion system 100 is part of an automobile internal combustion engine (ICE), the fuel injector 108 may be coupled to the chamber head 104 of the chamber 101. Alternatively, in case the combustion system 100 is part of a turbojet engine, the fuel injector 108 may be coupled to the chamber sidewalls 102. Further, in case the fuel injector 108 is coupled to the chamber head 104, the fuel injector 108 may be positioned substantially at the center of the chamber head 104. In other instances, however, the fuel injector 108 may be positioned off-center. In instances of the off-center positioning, the fuel injector 108 may be angled such that when the fuel is sprayed from the fuel injector 108, the fuel spray is directed substantially towards the center of the chamber 101. Similarly, in case the fuel injector 108 is coupled to the chamber sidewalls 102, the fuel injector 108 may be angled to spray the fuel towards the center of the chamber 101.

The igniter 110 may include a spark plug that is configured to deliver an electric current from an ignition system to the combustion chamber 101 to ignite the compressed fuel/air mixture by means of an electric spark. To this end, the spark plug may include a metal shell, electrically isolated from a central electrode by an insulator (not shown). The metal shell may be electrically grounded. The central electrode may protrude through the insulator into the combustion chamber 101, forming a spark gap between the inner end of the central electrode and one or more protuberances or structures attached to the inner end of the metal shell. In certain embodiments, the one or more protuberances may be representative of the ground electrode(s). The spark plug, thus, operates by sending small, high-voltage electrical sparks across the gap between the two electrodes. The spark ignites the air-fuel mixture in the combustion chamber 101. In case of an automobile engine, the combustion may lead to a controlled explosion that forces the piston towards the bottom of the chamber 101, generating the power needed to move the automobile.

Moreover, the igniter 110 may be positioned such that the spark gap is in communication with the compressed air/fuel mixture within the chamber 101. For example, the igniter 110 may be coupled to the chamber head 104 in proximity to the fuel injector 108. Alternatively, the igniter 110 may be coupled to the chamber sidewalls 102 adjacent to or opposite the fuel injector 108. It will be understood that in certain embodiments of the combustion system 100, use of the igniter 110 may be circumvented. In such embodiments, the temperature of the compressed air may be high enough to automatically combust the fuel as soon as the fuel is sprayed into the chamber 101.

In accordance with some aspects of the present disclosure, the first electrode 116 and the second electrode 118 may be disposed about the combustion chamber 101. More particularly, in one embodiment, the first electrode 116 may include one or more electrically conductive elements disposed along the chamber head 104 such that a portion of the first electrode 116 extends outside the chamber 101, while a portion of the first electrode 116 is disposed within the chamber 101. Similarly, the second electrode 118 may include one or more electrically conductive elements that may be disposed along the chamber bottom 106 such that the second electrode 118 is at least partially disposed within the chamber 101 and partially outside the chamber 101. In case the combustion chamber 101 is made of a metallic material, one or more insulators 120 may be disposed between the electrodes 116, 118 to electrically isolate the first electrode 116 from the second electrode 118.

Figure 2:
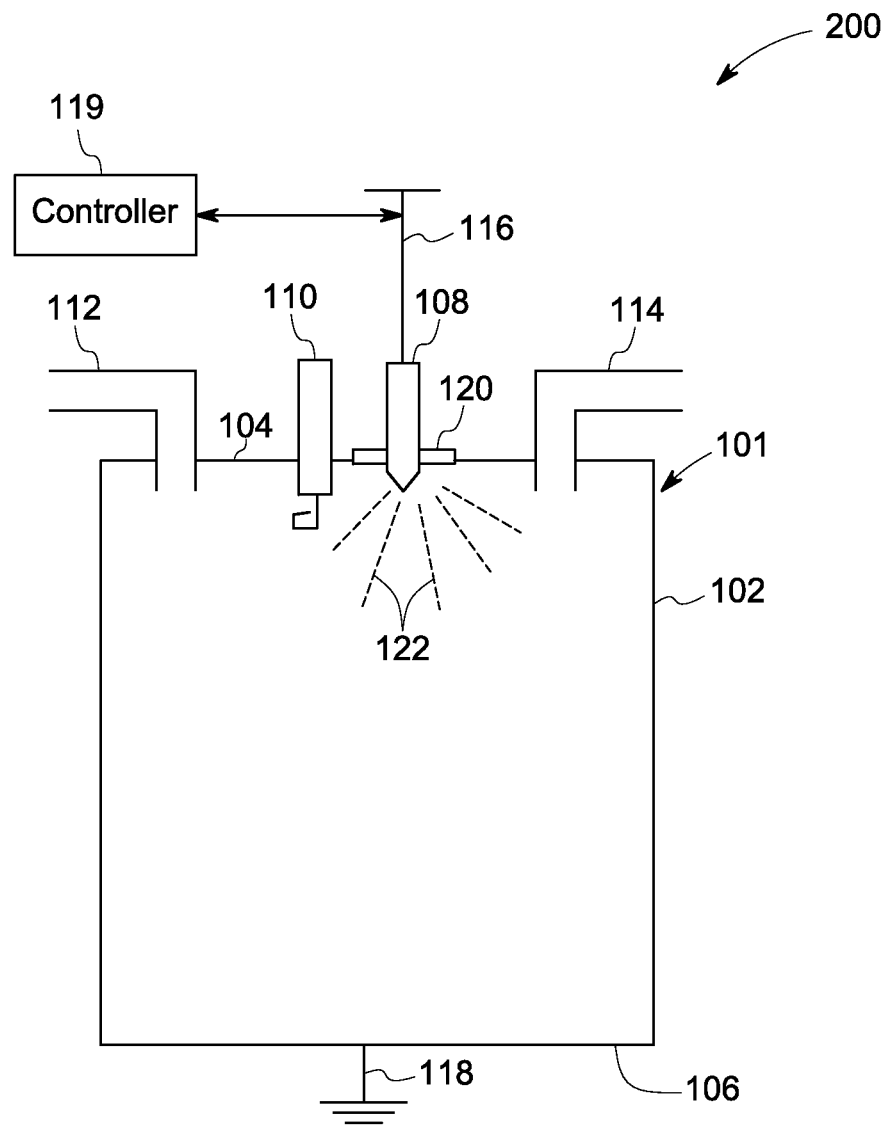
FIG. 2 is a diagrammatical representation of another exemplary combustion system, according to aspects of the present disclosure.

Furthermore, in accordance with another aspect of the present disclosure, instead of incorporating standalone electrodes, elements of the combustion system 100 may be configured as the first electrode 116 and the second electrode 118. In the presently contemplated configuration of a combustion system, the fuel injector 108 may be configured as the first electrode 116 and the combustion chamber 101 may be configured as the second electrode 118. FIG. 2 is a diagrammatical representation 200 of another embodiment of the combustion system 100 of FIG. 1, where the fuel injector 108 is configured as the first electrode 116 and the combustion chamber 101 is configured as the second electrode 118. It will be understood that most of the combustion chamber 101 may be formed of metallic materials and therefore may be an electrical conductor, other elements of the combustion chamber 101 may also be utilized as the first and second electrodes 116, 118 without departing from the scope of the present disclosure. In the embodiment of FIG. 2, the fuel injector 108 is configured as or is representative of the first electrode 116 and the combustion chamber 101 is configured as or is representative of the second electrode 118. It will be understood that this arrangement is exemplary, and other elements of the combustion chamber 101 may be representative of the first and second electrodes 116, 118 without departing from the scope of the present disclosure. For instance, the chamber head 104 and/or the chamber sidewalls 102 may be configured as the first electrode 116 and the chamber bottom 106 and/or the chamber sidewalls 102 may be configured as the second electrode 118. Alternatively, the inlet valve 112 or the outlet valve 114 may be configured as first electrode 116 and the chamber bottom 106 may be configured as the second electrode 118.

With continuing reference to FIG. 2, the first electrode 116 may be maintained at a high potential, while the second electrode 118 may be maintained at ground. Accordingly, in the example of FIG. 2, the fuel injector 108 may be maintained at the high potential by providing a high potential electric signal (in the range of hundred volts to 100 KV) to the fuel injector 108. The combustion chamber 101 may be grounded. Alternatively, the combustion chamber 101 may be maintained at an electrical potential equal in magnitude to the high potential of the fuel injector 108 but having an opposite polarity. Further, the fuel injector 108 may be electrically isolated from the combustion chamber 101 by one or more insulators, such as an insulator 120. For example, ceramic, porcelain, rubber, wooden, or glass insulators may be utilized. In one embodiment, the insulator 120 may be shaped as a ring or a hollow cylinder disposed between the fuel injector 108 and the chamber 101. Alternatively, the insulator 120 may have any shape or size suitable to form an electrical barrier between the fuel injector 108 and the combustion chamber 101. The insulator 120 may be configured to electrically isolate the fuel injector 108 (i.e., the first electrode 116) from the chamber 101 (i.e., the second electrode 118).

It may be noted that in the present disclosure, the first electrode 116 is maintained at a positive potential, while the second electrode 118 is maintained at ground. It will be understood that such a selection is merely adopted to describe certain aspects of the present disclosure and not to limit the scope of the present disclosure. Moreover, it will be understood that various other combinations of electrode potentials may be considered without departing from the scope of the present disclosure. For example, the first electrode 116 may be maintained at a negative potential, while the second electrode 118 may be maintained at a positive potential. Alternatively, the first electrode 116 may be held at a positive potential and the second electrode 118 may be held at a negative potential. In some embodiments, the potential of the first and second electrodes 116, 118 may be alternated periodically without departing from the scope of the present disclosure.

Figure 3A:
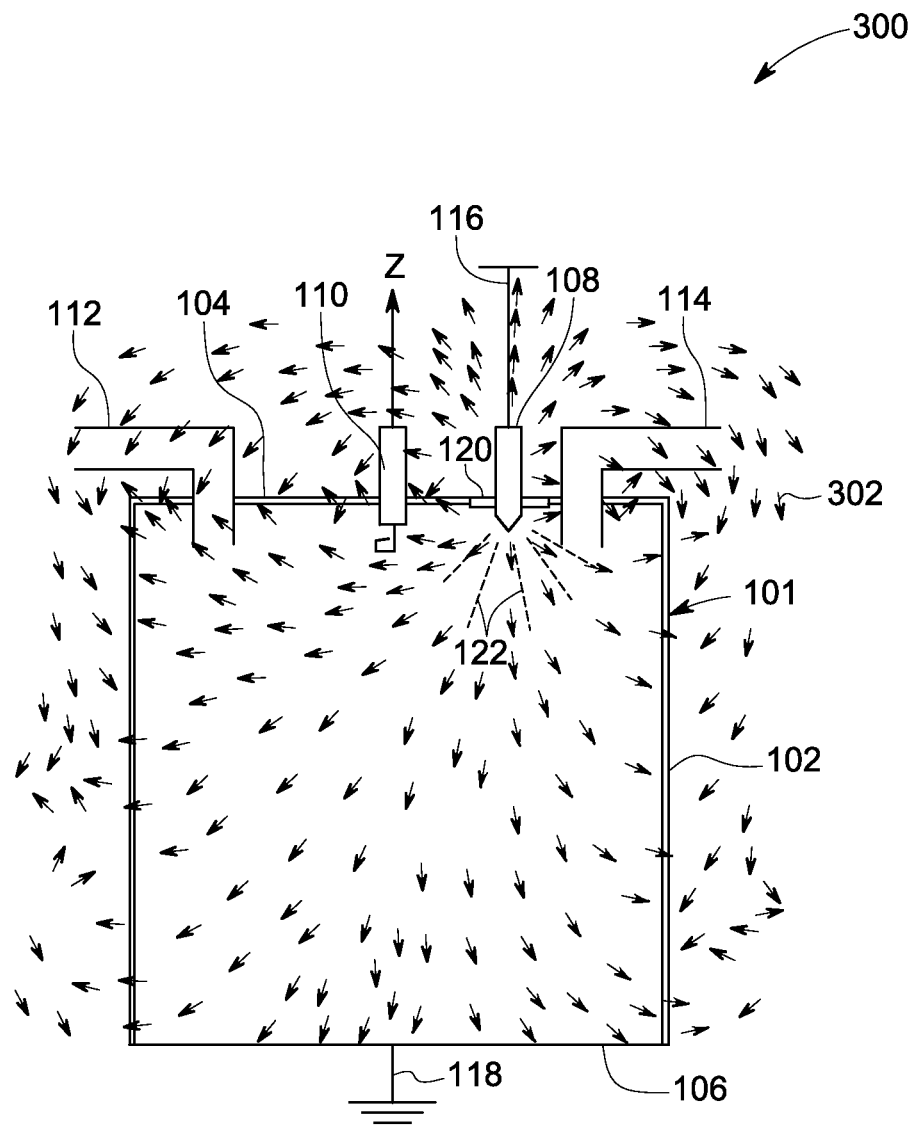
FIG. 3A is a front view of the exemplary combustion system of FIG. 2 illustrating an electromagnetic field, according to aspects of the present disclosure.
Figure 3B:
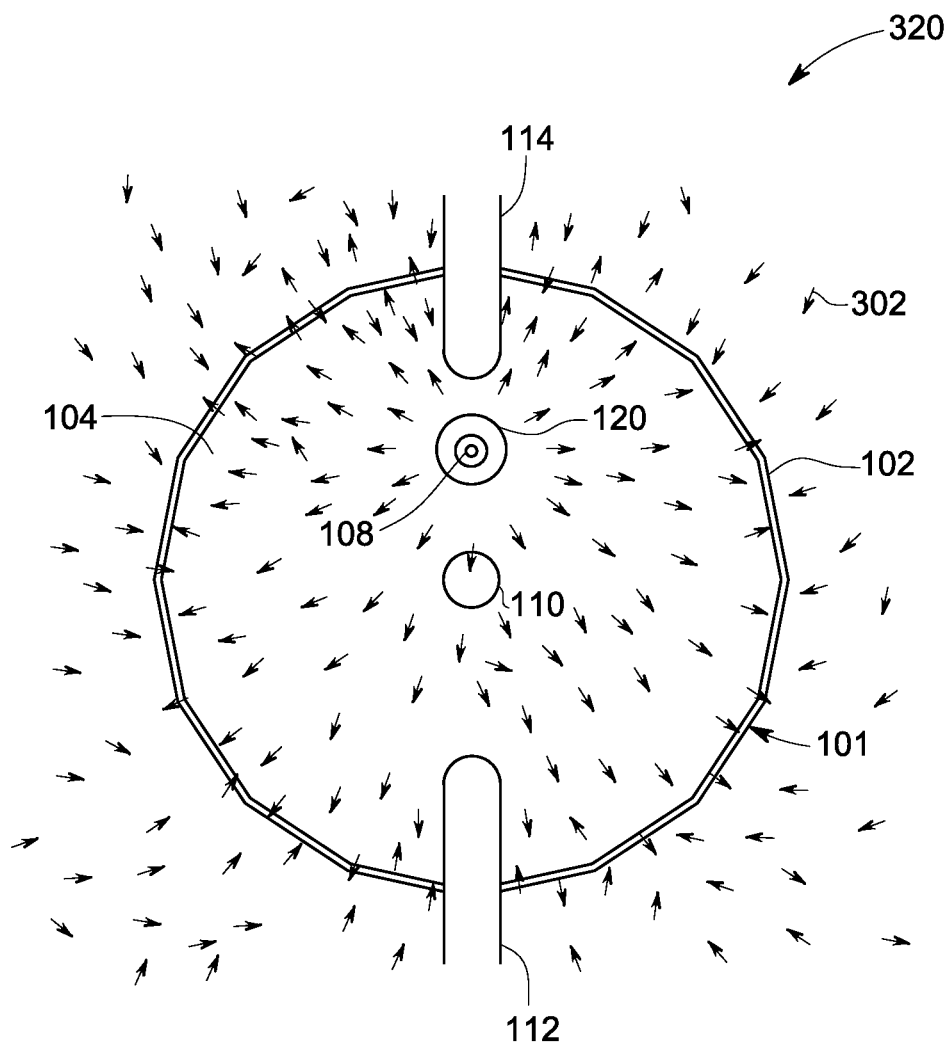
FIG. 3B is a top view of the exemplary combustion system of FIG. 2 illustrating an electromagnetic field, according to aspects of the present disclosure.

Further, when a high voltage electric signal is applied to the first electrode 116 and/or the second electrode 118, an electromagnetic field may be generated between the first and second electrodes 116, 118. FIGS. 3A and 3B illustrate an exemplary electromagnetic field that is generated between the first and second electrodes 116, 118. More particularly, FIG. 3A is a diagrammatical representation of a front view 300 of the combustion chamber 101 and FIG. 3B is a diagrammatical representation of a top view 320 of the combustion chamber 101. In FIGS. 3A and 3B, the first electrode 116 (i.e., the fuel injector 108) is maintained at a positive potential while the second electrode 118 (i.e., the combustion chamber 101) is grounded. Accordingly, the electromagnetic field (diagrammatically represented by reference numeral 302) extends from the first electrode 116 to the second electrode 118. Consequently, the electromagnetic field lines 302 radiate out from the fuel injector 108 towards the chamber head 102, the chamber sidewalls 104, and the chamber bottom 106.

Moreover, the strength of the electromagnetic field 302 may depend on a potential difference between the first electrode 116 and the second electrode 118. For example, the higher the potential difference between the first and second electrodes 116, 118, greater is the strength of the electromagnetic field 302. Additionally, the shape of the electromagnetic field 302 between the first electrode 116 and the second electrode 118 may depend on the geometry of the electrically conductive elements of the first and second electrodes 116, 118. For example, needle-shaped conductive elements may generate a more concentrated electric field that may be focused towards the center of the chamber 101. However, parallel plate-shaped conductive elements may generate an electric field that may be uniformly spread out about the chamber 101. Therefore, depending on a desired shape of the electromagnetic field 302, the shape of the first and second electrodes 116, 118 may be varied.

Also, consequent to the application of the high voltage electric signal to the fuel injector 108, the fuel droplets 122 that exit the fuel injector 108 and enter the chamber 101 may be electrostatically charged by the high potential of the first electrode 116. For instance, the fuel droplets 122 may be ionized into positive ions and negative ions, thus reducing the size of the fuel droplets 122. The charged fuel droplets 122 may subsequently follow or be influenced by a trajectory governed by the electromagnetic field 302. In the embodiments of FIGS. 3A and 3B, as the electromagnetic field 302 exists between the fuel injector 108 and the chamber 101, the charged fuel droplets 122 may uniformly travel towards the negative potential, i.e., towards the chamber head 102, the chamber sidewalls 104, and the chamber bottom 106. Such movement or trajectory of the fuel droplets 122 enhances a spray diameter of the injected fuel droplets 122. As used herein, the term spray diameter is used to refer to the distance between the fuel droplets 122 furthest away from each other in a plane furthest away from the fuel injector 108. In addition, the spray diameter may also be enhanced because the ionized fuel droplets 122 that exit the fuel injector 108 may all be charged to substantially the same potential. More particularly, as all the fuel droplets 122 have a substantially similar potential, these fuel droplets 122 may repel each other, thereby increasing the spray diameter.

Furthermore, the ionization of the fuel droplets 122 may affect any chemical reactions that may occur between the fuel and the air, between a combustion product and the air, or between the fuel and the combustion product within the combustion chamber 101. The combustion product may be representative of chemical compounds or mixtures obtained after combustion. By ionizing the fuel droplets 122 into constituent ions, the exemplary combustion system 100 of the present disclosure may aid in chemical reactions that may lead to a smoother and more efficient combustion. Such efficient combustion may lead to release of exhaust gases with lower emission levels.

Additionally, liquid fuel droplets 122 may split into smaller secondary droplets due to Coulomb fission. In Coulomb fission, highly charged "primary droplets" undergo successive breakup due to the instability of the charged primary droplets. The instability of the charge on the primary droplets may result in a multitude of smaller secondary drops. Moreover, Coulomb fission may occur in droplets that are charged to the Rayleigh limit. Therefore, fuel droplets 122 charged up to the Rayleigh limit of the droplets may be further split into smaller secondary droplets. Such a division of primary droplets into secondary droplets further reduces the size of the droplets and consequently aids in better combustion of the fuel. Gaseous or solid fuel droplets 122, on the other hand, may cause partial discharge within the chamber 101. Moreover, in case of gaseous and solid fuel droplets 122, Coulomb fission may not occur and these fuel droplets 122 may be merely ionized by the electrostatic charge of the first electrode 116.

In accordance with aspects of the present disclosure, the positioning of the second electrode 118 may be controlled to determine the trajectory and/or the spray diameter of the fuel droplets 122 exiting the fuel injector 108. For instance, if the second electrode 118 is disposed at the chamber bottom 106, directly opposite the fuel injector 108, the electromagnetic field 302 so generated within the combustion chamber 101 may guide the fuel droplets 122 towards the chamber bottom 106 and away from the chamber sidewalls 104, thereby reducing the spray diameter of the fuel droplets. Alternatively, if the entire combustion chamber 101 is configured as the second electrode 118, the fuel droplets 122 exiting the fuel injector 108 may spread towards the chamber head 104, the chamber sidewalls 102 and the chamber bottom 106, thereby increasing the spray diameter.

Furthermore, the electrical strength of the first electrode 116 and/or the second electrode 118 may govern the strength of the electromagnetic field 302. Consequently, in accordance with aspects of the present disclosure, the strength of the electromagnetic field 302 may be employed to govern the speed with which the fuel droplets 122 enter the chamber 101 and the spray diameter of the fuel droplets 122. For instance, if the strength of the electromagnetic field 302 is very high, the droplets 122 may be charged to a higher potential. Consequently, these highly charged fuel droplets 122 may travel towards the second electrode 118 at a greater speed. Such movement may result in the droplets 122 reaching further into the combustion chamber 101 before combustion and hence having a greater spray diameter. However, if the strength of the electromagnetic field 302 is low, the droplets 122 may be charged to a lower potential. Due to the lower charge, these fuel droplets 122 may travel towards the second electrode 118 at a lower speed. With slower movement, the fuel droplets 122 may travel a considerably smaller distance within the chamber 101 before combustion and the fuel droplets 122 may have a smaller spray diameter. Accordingly, the speed at which the fuel droplets 122 travel from the first electrode 116 to the second electrode 118 and the spray diameter of the droplets 122 may be altered by varying the strength of the electromagnetic field 302 between the first and second electrodes 116, 118.

In the illustrated embodiment of FIG. 3A, as the fuel is sprayed into the chamber 101, the fuel may uniformly reach all locations within the chamber 101. Consequently, when the fuel is ignited, the combustion may be uniform. Moreover, as the fuel spreads in all directions, the fuel droplets 122 may not cling to each other to form larger droplets. Instead, the similarly charged fuel droplets 122 may repel each other, thereby preventing any clinging or agglomerating. Therefore, the similarly sized fuel droplets may combust more uniformly and simultaneously during combustion, leading to exhaust gases with lower emission levels.

Further, in accordance with other aspects of the present disclosure, the trajectory and consequently the spray diameter of the fuel droplets 122 may be controlled. For instance, the trajectory of the fuel droplets 122 may be changed by altering the electric signal applied to the electrodes 116, 118. By way of example, the electric signal applied to the fuel injector 108 may be increased. This increase in the applied electric signal in turn increases the strength of the electromagnetic field 302. Consequently, this increase in the strength of the electromagnetic field 302 may be used to increase the spray diameter of the fuel droplets 122. Furthermore, the increase in the spray diameter of the fuel droplets 122 aids in igniting and utilizing more oxygen during the combustion process. Alternatively, the electric signal applied to the first electrode 116 may be reduced, thereby decreasing the strength of the electromagnetic field 302. Consequently, the spray diameter of the fuel droplets 122 is reduced. This reduction in the spray diameter of the fuel droplets 122 aids in preventing the fuel droplets 122 from clinging to the chamber sidewalls 102 before combustion, thereby enhancing the combustion of the fuel in the combustion chamber 101.

According to aspects of the present disclosure, the electric signal applied to the first electrode 116 and/or the second electrode 118 may be a direct current (DC) signal. Alternatively, the applied electric signal may be an alternating current (AC) signal. In case of a DC signal, the strength of the electromagnetic field 302 and in turn the spray diameter and trajectory of the fuel droplets 122 may be maintained at a constant value. However, in case of an AC signal, the polarity of the electric signal may alternate based on the frequency of the AC signal. Therefore, periodically, the potential of the first electrode 116 and/or the second electrode 118 may alternate between a positive potential and a negative potential. With such a varying electric signal applied to the first electrode 116 and/or the second electrode 118, the electromagnetic field 302 may also alternate periodically. This variation in the electromagnetic field 302 may be employed to periodically vary the trajectory of the fuel droplets 122. Such variation in fuel trajectory may be desirable in cases where uniform spread of the fuel is desired.

Moreover, in case the applied electric signal is an AC signal, the electric signal may be a low frequency AC signal or a high frequency AC signal. Low frequency AC signals may be sinusoidal, triangular, saw-tooth, or square wave signals having a frequency lower than 100 Hz. High frequency AC signals may have a frequency higher than 100 Hz. Moreover, in case of AC signals, the electric signal may be a sinusoidal signal, a square-wave signal, or a saw-tooth signal. Any other signal forms may also be considered within the scope of the present disclosure.

The fuel droplets 122 and the fuel described with reference to FIGS. 1 and 2 may include liquid fuels, solid fuels and/or gaseous fuels. Some exemplary fuels may include dodecane, petrol, kerosene, gasoline, methane, natural gas, liquefied natural gas, liquefied petroleum gas, coal, lignite, charcoal, and the like. It will be understood that these liquid, solid, or gaseous fuels are merely exemplary, and any other combustible liquids, solids, or gases may be employed in the combustion system 100 without departing from the scope of the present disclosure.

Figure 4:
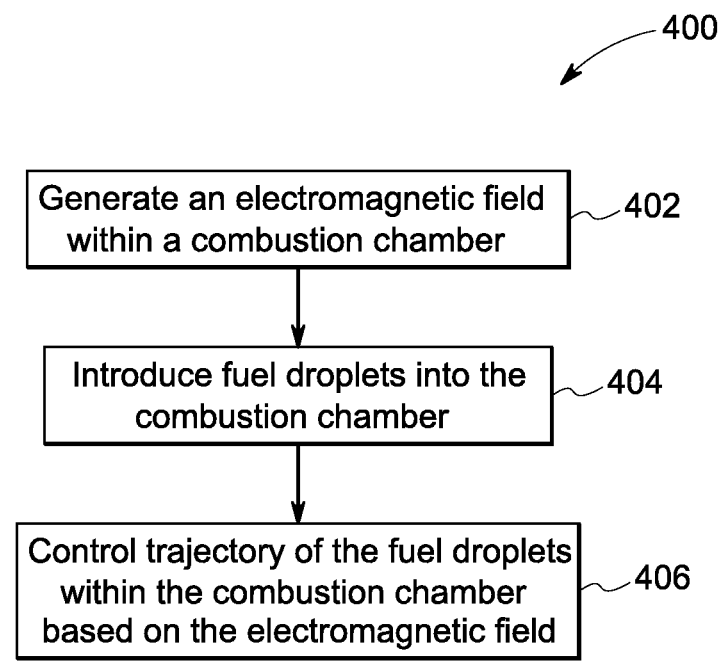
FIG. 4 is a flowchart illustrating an exemplary method for controlling a trajectory of a fuel in a combustion chamber of the exemplary combustion system, according to aspects of the present disclosure.

FIG. 4 is a flowchart 400 illustrating an exemplary method for controlling the trajectory of a fuel within a combustion chamber, such as the combustion chamber 101 (see FIG. 1). The method 400 will be described with reference to FIGS. 1-3. The method begins at step 402 where an electromagnetic field 302 is generated within the combustion chamber 101. To that end, in one example, a first electrode 116 may be disposed at the fuel injector 108. In addition, the second electrode 118 may be disposed on the combustion chamber 101. Alternatively, the fuel injector 108 may be configured as the first electrode 118, while the combustion chamber 101 may be configured as the second electrode 118. Further, an electric signal, such as a DC signal or an AC signal may be applied to the first and/or second electrodes 116, 118 to create a potential difference between the first and second electrodes 116, 118 and consequently generate the electromagnetic field 302.

In accordance with aspects of the present disclosure, various parameters of the electromagnetic field 302, such the strength, direction, and shape of the electromagnetic field 302 may be controlled. The strength of the electromagnetic field 302 may be controlled by varying the voltage of the applied electric signal. For instance, a higher potential difference between the first and second electrodes 116, 118 may lead to stronger electromagnetic fields. In a similar fashion, the direction of the electromagnetic field 302 may be controlled by varying the potential difference between the first and second electrodes 116, 118. By way of example, if the first electrode 116 is maintained at a positive potential and the second electrode 118 is maintained at a negative potential, the electric lines of force may flow from the first electrode 116 to the second electrode 118. Alternatively, if the first electrode is 116 maintained at a negative potential and the second electrode 118 is maintained at a positive potential, the electric lines of force may flow from the second electrode 118 to the first electrode 116. Moreover, by utilizing an AC electric signal, the direction of the electromagnetic field 302 may be varied periodically. Similarly, the shape of the electromagnetic field 302 may be controlled by modifying the geometry and position of the first and second electrodes 116, 118. For instance, needle-shaped electrically conductive elements of the first and/or second electrodes 116, 118 may lead to more concentrated electromagnetic fields, while plate shaped conductive elements may lead to more spread out electromagnetic fields.

Also, the second electrode 118 may be disposed at any position on the combustion chamber 101. For instance, the second electrode 118 may be coupled to the chamber bottom 106. In such a case, the chamber bottom 106 may be electrically insulated from the chamber sidewalls 102 and the chamber head 102 via use of a suitable insulator.

Subsequently, the fuel droplets 122 may be introduced into the combustion chamber 101, as depicted by step 404. As described previously with reference to FIGS. 1 and 2, the fuel injector 108 may be configured to introduce the fuel droplets 122 into the chamber 101. Moreover, the fuel injector 108 may be coupled to a fuel reservoir (not shown) via a connecting tube that delivers the fuel from the fuel reservoir to the fuel injector 108. Further, the fuel injector 108 may be configured to break the fuel into small droplets and spray these droplets into the chamber 101 in a controlled manner. For example, based on the conditions within the combustion chamber 101 and/or the quality of the exhaust gases, the fuel injector 108 may be configured to receive commands that control the timing and/or quantity of fuel delivery to the combustion chamber 101. As the fuel escapes from the nozzles of the fuel injector 108, the fuel may be broken down into small droplets.

As described previously, the high potential at the first electrode 116 (i.e., the fuel injector 108) may aid in ionizing the fuel droplets 122 sprayed by the fuel injector 108. For instance, the fuel droplets 122 may be ionized into positive and negative ions. Moreover, because of the amount of charge placed on the fuel droplets 122, the fuel droplets 122 may be further split into smaller secondary droplets due to Coulomb fission. In other embodiments, formation of ions in the fuel droplets 122 may result in chemical reactions that may be different from the chemical reactions possible in case of non-ionized fuel droplets 122. Furthermore, such chemical reactions may promote combustion that is more efficient. For instance, the ionized fuel droplets 122 may promote greater emission of ultraviolet (UV) photons during combustion, which in turn may lead to a smoother and more efficient combustion.

At step 406, trajectory of the fuel droplets 122 within the combustion chamber 101 may be controlled based on the electromagnetic field 302 between the first and second electrodes 116, 118. More particularly, the trajectory of the fuel droplets 122 within the combustion chamber 101 may be controlled based on a direction and magnitude of the electromagnetic field 302. For instance, the fuel droplets 122 follow the electric lines of force created by the electromagnetic field 302 between the first electrode 116 and the second electrode 118. Moreover, according to some aspects of the present disclosure, as the electromagnetic field 302 exists between the first electrode 116 and the second electrode 118 (i.e., between the fuel injector 108 and the combustion chamber 101), electric lines of force may exist between the fuel injector 108 and the combustion chamber 101. Therefore, the fuel droplets 122 may travel in all directions to different portions of the combustion chamber 101 before combustion.

In case the second electrode 118 is positioned at a determined portion of the combustion chamber 101 (for example, the chamber bottom 106) in the form of multiple needle-shaped electrically conductive elements, the electric lines of force may travel in a focused field from the first electrode 116 towards the chamber bottom 106. In this case, the fuel droplets 122 may travel towards the chamber bottom 106 at a more focused trajectory and with a relatively smaller spray diameter. In the conventional fuel injector systems, small diameter sprays lead to assimilation of fuel droplets into larger droplets. However, in accordance with aspects of the present disclosure, as the fuel droplets 122 are ionized, the fuel droplets 122 may rarely assimilate to form bigger droplets. Therefore, even with a more focused trajectory, the fuel droplets 122 may still remain relatively small, thereby enhancing the combustion of the fuel in the combustion chamber 101. As described previously, this phenomenon may occur because the fuel droplets 122 are charged to substantially similar potentials and these similarly charged droplets repel each other.

Additionally, as described previously, the magnitude of the potential difference between the first electrode 116 and the second electrode 118 may be used to control the speed with which the fuel droplets 122 travel towards the second electrode 118 and the spray diameter of the fuel spray. The higher the potential difference between the first electrode 116 and the second electrode 118, the faster is the speed with which the fuel droplets 122 travel towards the second electrode 118. Similarly, a higher potential difference between the first and second electrodes 116, 118 may result in a larger spray diameter. In some embodiments, the electromagnetic field 302 may be a varying field (in case of AC electric signals), which may vary the trajectory of the fuel droplets 122 over time, thereby enabling the fuel droplets to spread out uniformly in the entire combustion chamber 101 for more effective combustion.

Accordingly, the electrostatically charged combustion system 100 of the present disclosure may be configured to control the trajectory of the fuel droplets 122 entering the combustion chamber 101. Moreover, by controlling the trajectory of the fuel droplets 122, the electrostatically charged combustion system 100 may also be configured to control the spray diameter of the fuel sprayed into the combustion chamber 101 before the combustion phase. Furthermore, the magnitude of the potential difference between the first electrode 116 and the second electrode 118 may be varied to control the time taken by the fuel droplets 122 to reach various portions of the chamber 101 before combustion. Such control aids the exemplary combustion chamber 101 in controlling the quality of exhaust gases exiting the combustion chamber 101. As embodiments of the combustion system 100 may be configured to guide the fuel droplets to areas of the combustion chamber 101 that typically do not receive enough fuel before combustion, the fuel may be combusted more completely, thereby releasing exhaust gases with lower emission than currently available combustion chambers. In accordance with some aspects of the present disclosure, the ionized fuel droplets 122 may lead to chemical reactions during combustion that are different from chemical reactions that may take place when fuel droplets are not ionized. These different chemical reactions may lead to more efficient combustion A skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure.

While only certain features of the invention have been illustrated and described herein, many modifications and changes may occur to those skilled in the art. It is, therefore, to be understood that the appended claims are intended to cover all such modifications and changes as fall within the true spirit of the disclosure.

The invention claimed is:

1. A combustion system, comprising:
    a hollow combustion chamber having a chamber head, chamber sidewalls, and a chamber bottom;
    a fuel injector coupled to the combustion chamber and configured to introduce a plurality of fuel droplets in the combustion chamber; and
    a first electrode and a second electrode disposed on or about the combustion chamber such that an electromagnetic field is generated between the first electrode and the second electrode in response to an applied electric signal, and wherein the electromagnetic field is configured to control a trajectory or a spray diameter of the plurality of fuel droplets within the combustion chamber.

2. The combustion system of claim 1, further comprising an inlet valve and an outlet valve operatively coupled to the combustion chamber.

3. The combustion system of claim 1, wherein the first electrode is disposed on the chamber head and the second electrode is disposed on or about one or more of the chamber sidewalls and the chamber bottom.

4. The combustion system of claim 1, further comprising an insulator disposed between the first electrode and the second electrode and configured to electrically isolate the first electrode from the second electrode.

5. The combustion system of claim 4, wherein the first electrode is maintained at a positive potential or a negative potential and the second electrode is maintained at a ground potential.

6. The combustion system of claim 1, wherein the combustion system is configured to:
    control a magnitude and a polarity of the electromagnetic field based on the applied electric signal; and
    vary a shape of the electromagnetic field based on a geometry of the first electrode or the second electrode, a position of the first electrode or the second electrode, or a combination thereof.

7. The combustion system of claim 1, wherein the applied electric signal comprises a direct current signal, a low frequency alternating current signal, or a high frequency alternating current signal.

8. The combustion system of claim 7, wherein the applied electric signal comprises a sinusoidal signal, a continuous signal, a non-continuous signal, a square-wave signal, a sawtooth signal, or combinations thereof.

9. The combustion system of claim 1, wherein the electromagnetic field between the first electrode and the second electrode is configured to charge the plurality of fuel droplets entering the combustion chamber.

10. A combustion system, comprising:
    a combustion chamber having a chamber head, chamber sidewalls, and a chamber bottom; and
    a fuel injector coupled to the combustion chamber and configured to channelize a fuel into the combustion chamber,
    wherein the fuel injector is operatively coupled to a voltage source and configured as a first electrode of the combustion system, wherein the combustion chamber is configured as a second electrode of the combustion system, and wherein the combustion system is configured to generate an electromagnetic field between the first electrode and the second electrode in response to an applied electric signal.

11. The combustion system of claim 10, further comprising an insulator disposed between the fuel injector and the combustion chamber to isolate the fuel injector from the combustion chamber.

12. The combustion system of claim 10, wherein the combustion system is configured to control a trajectory or a spray diameter of the fuel within the combustion chamber based on a magnitude and direction of the electromagnetic field.

13. The combustion system of claim 12, wherein the combustion system is configured to:
control the magnitude and the direction of the electromagnetic field based on the applied electric signal; and
vary a shape of the electromagnetic field based on a geometry of the first electrode or the second electrode, a position of the first electrode or the second electrode, or a combination thereof.

14. The combustion system of claim 13, wherein the applied electric signal comprises at least one of a direct current signal, a low frequency alternating current, and a high frequency alternating current.

15. The combustion system of claim 13, wherein the applied electric signal comprises a sinusoidal signal, a continuous signal, a non-continuous signal, a square-wave signal, a saw-tooth signal, or combinations thereof.

16. The combustion system of claim 10, wherein the first electrode is maintained at a positive or negative potential and the second electrode is maintained at a ground potential.

17. The combustion system of claim 10, wherein the fuel injector is configured to receive an electric signal having a first potential and the combustion chamber is configured to receive an electric signal having a second potential, and wherein the first potential and second potential are equal in magnitude and opposite in polarity.

18. A method for controlling the trajectory of a plurality of fuel droplets within a combustion chamber, the method comprising:
generating an electromagnetic field between a first electrode and a second electrode disposed about the combustion chamber;
introducing the plurality of fuel droplets into the combustion chamber; and
controlling the trajectory of the plurality of fuel droplets within the combustion chamber based on a direction and magnitude of the electromagnetic field.

19. The method of claim 18, further comprising electrostatically charging the plurality of fuel droplets entering the combustion chamber.

20. The method of claim 18, further comprises controlling a spray diameter of the plurality of fuel droplets based on the magnitude of the electromagnetic field.

* * * * *